(12) United States Patent
Beyer et al.

(10) Patent No.: US 8,862,351 B2
(45) Date of Patent: Oct. 14, 2014

(54) SYSTEM AND METHOD FOR CONTROLLING SHIFT HUNTING IN VARIABLE TRANSMISSIONS

(75) Inventors: Michael Beyer, Chillicothe, IL (US); Adam Vaccari, Peoria, IL (US); Christopher Rhoades, Metamora, IL (US); Adam Nackers, East Peoria, IL (US); Brian Lister, Edwards, IL (US); Mike Barngrover, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 315 days.

(21) Appl. No.: 13/485,390

(22) Filed: May 31, 2012

(65) Prior Publication Data

US 2013/0325270 A1 Dec. 5, 2013

(51) Int. Cl.
G06F 7/00 (2006.01)
G06F 17/00 (2006.01)
G06F 19/00 (2011.01)

(52) U.S. Cl.
USPC .................. 701/62; 701/51; 701/55; 701/56; 701/61

(58) Field of Classification Search
None
See application file for complete search history.

(56) References Cited

U.S. PATENT DOCUMENTS

| 4,509,125 | A | * | 4/1985 | Fattic et al. | 701/61 |
| 5,669,850 | A | | 9/1997 | Dourra et al. | |
| 5,684,694 | A | * | 11/1997 | Ishino et al. | 701/51 |
| 6,098,004 | A | | 8/2000 | Grytzelius et al. | |
| 6,220,987 | B1 | | 4/2001 | Robichaux et al. | |
| 6,292,730 | B1 | * | 9/2001 | Takizawa et al. | 701/51 |
| 6,393,945 | B1 | * | 5/2002 | Kuras | 74/733.1 |
| 6,766,237 | B2 | * | 7/2004 | Watanabe et al. | 701/51 |
| 7,513,847 | B2 | * | 4/2009 | Tabata et al. | 477/15 |
| 7,529,607 | B2 | | 5/2009 | Aubert | |
| 7,660,657 | B2 | | 2/2010 | DeMarco et al. | |
| 7,809,485 | B2 | * | 10/2010 | Kobayashi et al. | 701/62 |
| 8,036,801 | B2 | * | 10/2011 | Tabata et al. | 701/55 |
| 8,105,191 | B2 | * | 1/2012 | Toyoda et al. | 474/28 |
| 8,467,946 | B2 | * | 6/2013 | Takahashi et al. | 701/55 |
| 8,571,768 | B2 | * | 10/2013 | Takahashi et al. | 701/51 |
| 8,655,560 | B2 | * | 2/2014 | Matsubara et al. | 701/51 |
| 2001/0041640 | A1 | * | 11/2001 | Sakai et al. | 475/207 |
| 2002/0028727 | A1 | * | 3/2002 | Iida et al. | 477/125 |
| 2006/0166784 | A1 | * | 7/2006 | Tabata et al. | 477/37 |
| 2006/0235596 | A1 | * | 10/2006 | Suzuki et al. | 701/51 |
| 2008/0149407 | A1 | * | 6/2008 | Shibata et al. | 180/65.2 |
| 2009/0005941 | A1 | * | 1/2009 | DeMarco et al. | 701/51 |
| 2009/0124454 | A1 | * | 5/2009 | Tabata et al. | 477/37 |
| 2011/0015834 | A1 | * | 1/2011 | Nonomura et al. | 701/51 |
| 2011/0015839 | A1 | * | 1/2011 | Takahashi et al. | 701/55 |

(Continued)

*Primary Examiner* — Khoi Tran
*Assistant Examiner* — Bao Long T Nguyen
(74) *Attorney, Agent, or Firm* — Leydig, Voit & Mayer, Ltd.

(57) ABSTRACT

A method of controlling a transmission (100) for a machine is disclosed. The transmission includes a variator (104). The transmission is operated in a first operating range (301). It is determined whether a current speed ratio is within a first predetermined range of a speed ratio associated with a first synchronous point (304) lying between the first operating range (301) and the second operating range (302). A desired speed ratio is determined and it is determined if the desired speed ratio is within a second predetermined range of the speed ratio. A shift between the first and second operating ranges (301, 302) is prevented and the variator (104) is controlled to hold the current speed ratio if the desired speed ratio is within the second predetermined range or the rate of acceleration of the machine is below the threshold acceleration.

19 Claims, 5 Drawing Sheets

(56) References Cited

U.S. PATENT DOCUMENTS

| | | | |
|---|---|---|---|
| 2012/0065854 A1* | 3/2012 | Stoller et al. | 701/60 |
| 2012/0083977 A1* | 4/2012 | Tanaka et al. | 701/55 |
| 2013/0013160 A1* | 1/2013 | Jozaki et al. | 701/51 |

* cited by examiner

SYSTEM AND METHOD FOR CONTROLLING SHIFT HUNTING IN VARIABLE TRANSMISSIONS

TECHNICAL FIELD

This patent disclosure relates generally to variable transmission systems and methods and, more particularly to systems and methods for controlling shift hunting in variable transmissions.

BACKGROUND

Many rotational power sources such as motors, engines, turbines, etc. have a relationship between torque and angular speed. Accordingly, drive trains which connect such power sources to a load, such as to power a machine, drive an implement or conduct other work, are provided with different usable gear ratios. The drive train relies on the relationship between output torque and angular speed (in revolutions per minute "RPM") to operate at a given gear ratio. Typically, the speed of the power source and/or the load determines the appropriate gear ratio for driving the load. In many systems, a drive train or transmission controller executes this selection with or without input from the operator of the machine.

The selection of gears ratios can lead to gear train oscillations, also known as shift hunting, when operating in a band around a shift point of the transmission. For example, such oscillations can occur when conditions immediately after a shift indicate that the immediately prior gear ratio should be selected instead. For example, consider a system wherein engine speed is used to determine an appropriate shift point between two gear ratios. When the shift point is reached during acceleration, i.e., increasing engine speed, the shift to a higher gear ratio will cause the engine speed to decrease to a speed lower than the shift point. This in turn, will cause the controller to execute a shift back to the lower gear. However, now the engine will unload and the engine speed will increase past the shift point, causing the controller to execute a shift back to the higher gear. Such oscillations can be inefficient and annoying, and may decrease the useful life of the drive train and the engine.

In parallel path variable transmissions, a variable direction hydrostatic element drives the gear train such as in certain split torque transmissions. One example of a hydrostatic transmission consists of a variable speed hydraulic pump and a hydraulic motor. In such a transmission, shift points result in a reversal in the direction of the variator acceleration. Thus, the shift points are necessarily defined such that the downshift and up-shift points between any two ratios are singular, i.e. they both lie at essentially the same RPM (or transmission ratio).

One example of a system for preventing shift hunting in a parallel path variable transmission is disclosed in U.S. Pat. No. 7,660,657. The disclosed system utilizes a lock-out timer that actuates after the transmission executes a shift in order to prevent a subsequent shift until the timer has expired. However, this is a reactive approach that locks the transmission into certain ranges and can lead to rough transitions when the transmission actually shifts between ranges.

SUMMARY

The disclosure describes, in one aspect, a method of controlling a transmission for a machine to at least partially avoid drive train oscillation. The transmission includes a variator and a plurality of contiguous selectable operating ranges with one or more pairs of adjacent operating ranges being separated by respective synchronous points. The transmission is operated in a first operating range. It is determined whether a current speed ratio defined as an output speed of the variator divided by an input speed of the variator is within a first predetermined range of a speed ratio associated with a first synchronous point lying between the first operating range and the second operating range. A desired speed ratio is determined and it is determined if the desired speed ratio is within a second predetermined range of the speed ratio associated with the first synchronous point. A shift between the first and second operating ranges is prevented and the variator is controlled to hold the current speed ratio at or near the first synchronous shift point if the desired speed ratio is within the second predetermined range or the rate of acceleration of the machine is below the threshold acceleration.

In another aspect, the disclosure describes a system for reducing drive train oscillations in a machine. The system includes a transmission having a variator. The transmission has a plurality of contiguous selectable operating ranges, one or more pairs of adjacent operating ranges being separated by respective synchronous points. An operator interface is provided for inputting information regarding operation of the transmission. A controller is in communication with the transmission and the operator interface. The controller is configured to detect whether a current speed ratio defined as an output speed of the variator divided by an input speed of the variator is within a first predetermined range of a speed ratio associated with a synchronous point. The controller determines whether a desired speed ratio based on information from the operator interface is within a second predetermined range of the speed ratio associated with the synchronous point. The controller determines if a rate of acceleration of the machine is below a threshold acceleration. The controller prevents a shift between a first and a second operating ranges and controls the variator to hold the current speed ratio at or near the synchronous shift point if the desired speed ratio is within the second predetermined range or the rate of acceleration of the machine is below the threshold acceleration.

DETAILED DESCRIPTION

This disclosure relates to a system and method for controlling transmission gear ratio oscillations caused by repetitive and/or unnecessary sequential up-shifts and down-shifts, also known as shift "hunting." It is especially useful in transmissions, such as in parallel path variable transmissions, where it is desirable to execute shifts at synchronous points rather than over a broader range of operating conditions.

Figure 1:
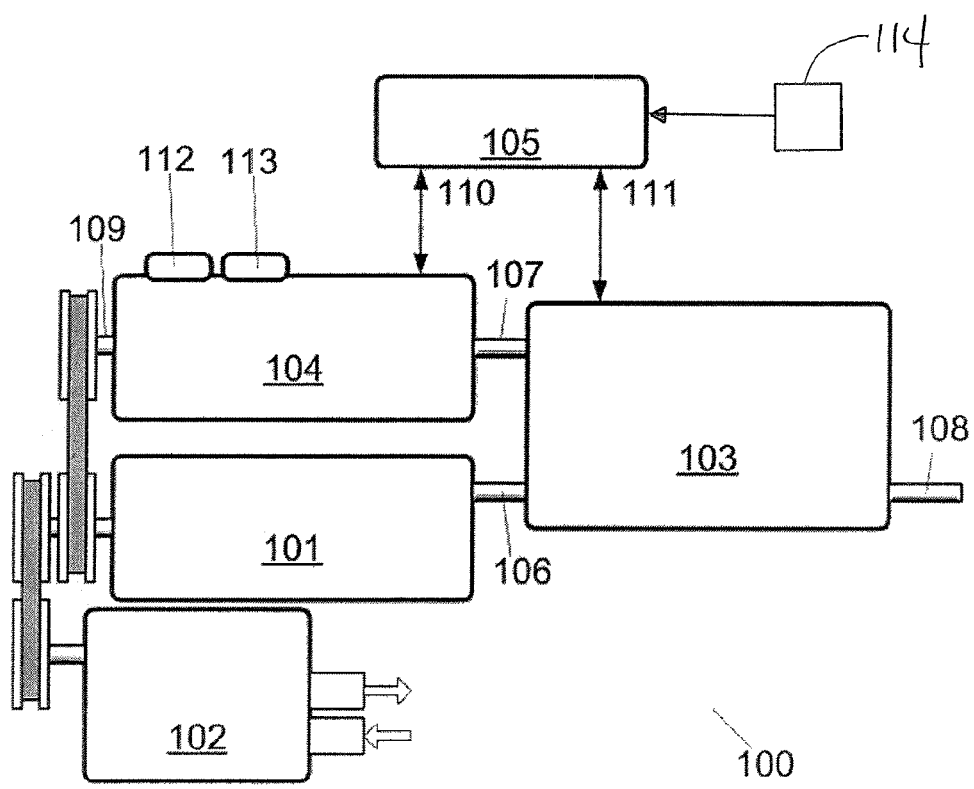
FIG. 1 is a schematic diagram of an exemplary transmission system with which a system or method for avoiding drive train oscillations according to the present disclosure can be implemented.

With particular reference to FIG. 1, a split torque transmission system 100 employing a variator drive element is shown. The transmission system 100 can include a number of primary elements including a power source such as an engine 101, a variator 104, and a transmission 103. As is known by those skilled in the art, the transmission 103 may include mechanical gearing, belts, pulleys, discs, chains and/or clutches. Moreover, the engine 101 may include any machine that converts energy into a mechanical force or motion. For example, the engine 101 could be an internal combustion engine such as a diesel engine, a gasoline engine, a gaseous fuel-powered engine, or any other type of engine apparent to one skilled in the art. The engine 101 may alternatively may alternatively embody a non-combustion source of power such as a fuel cell, a battery, or an electric motor, if desired.

The illustrated transmission system 100 may be used in a machine (not shown) to provide power and/or motor force to move the machine and/or allow the machine to do work. For example, the transmission system 100 may deliver power to one or more drive axle, wheel, track, propeller, or any other device that will move the machine in a direction. Additionally or alternatively, the transmission system 100 may deliver power to a work implement that is carried by the machine including, for example, buckets, compactors, forked lifting devices, brushes, grapples, cutters, shears, blades, breakers/hammers, augers, and others. As will be understood by those skilled in the art, the term "machine" may refer to any machine that performs some type of operatio associated with an industry such as mining, construction, farming, transportation, or any other industry known in the art. For example, the machine may be an earth-moving machine, such as a wheel loader, track loader, bulldozer, excavator, dump truck, backhoe, grader, material handler or the like.

The transmission system 101 may operate based, at least in part, in response to an input received from an operator interface 114. The operator interface 114 may be located within an operator station of the machine, for example, in close proximity to an operator's seat. The operator interface 114 may embody any one of numerous devices that control functions of the machine. In one example, the operator interface may embody a joystick controller. It is contemplated, however, that operator interface may embody additional or different control devices such as, for example, pedals, levers, switches, buttons, wheels, and other control devices known in the art. The operator interface 114 may be manipulated to generate signals indicative of a desired output of the transmission system 100 (i.e., a desired travel speed and/or torque).

In the illustrated embodiment, the engine 101 and variator 104 are linked to the transmission 103 via respective input shafts 106 and 107. The engine 101 drives the variator 104 via input 109. The engine 101 also drives a hydraulic pump 102 that provides pressurized hydraulic fluid to a number of elements including the variator 104. As shown in FIG. 1, the variator 104 can include a transmission input speed sensor 112 and a transmission output speed sensor 113.

Figure 2:
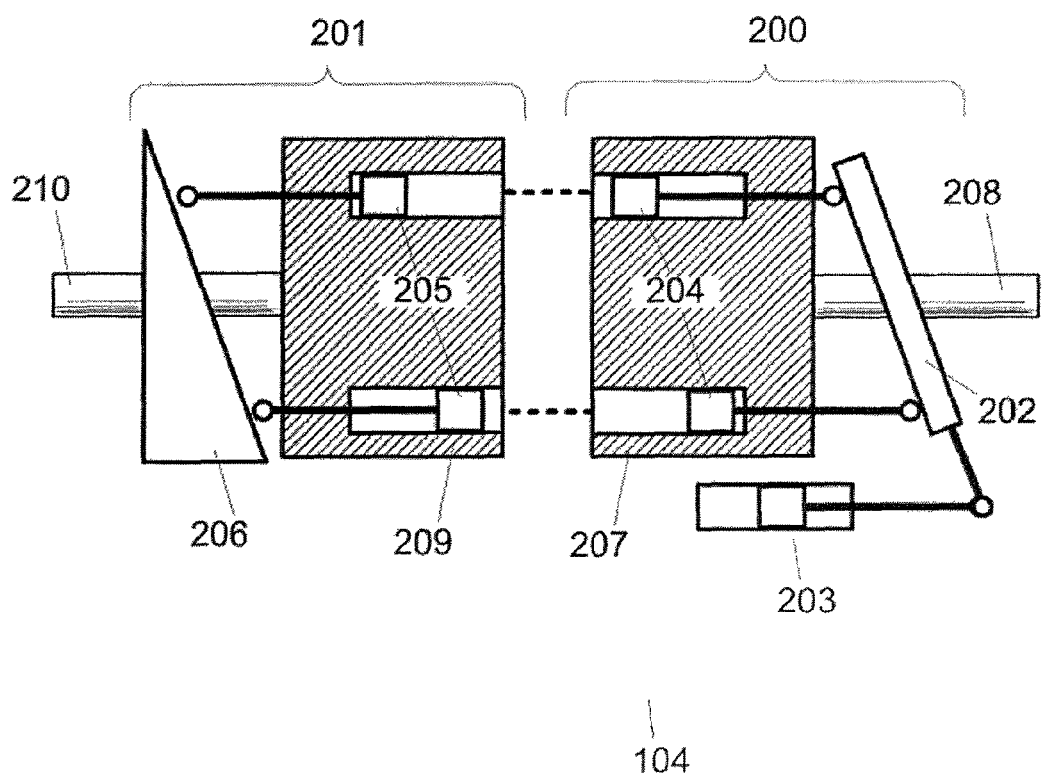
FIG. 2 is a schematic drawing of a variator usable in conjunction with a transmission system such as that shown schematically in FIG. 1.

The torque and speed relationship between the variator input 109 and output 107 may be controlled by a controller 105, as will be briefly explained with reference to FIG. 2. FIG. 2 is a schematic drawing of a variator 104 usable in conjunction with a transmission system 100 such as that shown schematically in FIG. 1. Referring to FIG. 2, the variator 104 can include a pump 200 and a motor 201. The pump 200 may comprise a variable angle swash plate 202 set by a swash plate actuator 203. With such an arrangement, a number of pistons 204 in respective chambers ride on the swash plate via sliding contacts, such that the range of movement of the pistons is set by the angle of the swash plate 202. The chambers for the pistons 204 may be formed in a pump carrier 207 that is rotated via the pump input shaft 208.

The motor 201 can comprise a similar arrangement including a number of pistons 205 in respective chambers. The pistons 205 of the motor 201 can be slidably engaged upon a fixed swash plate 206. In this instance, the chambers of the pistons 204 of the pump 200 are in fluid communication with the chambers of the pistons 205 of the motor 201 via hydraulic fluid that fills the chambers and intervening conduits (not shown). The chambers for the pistons 205 can be formed in a motor carrier 209 that rotates the motor output shaft 210. As the angle of the swash plate 202 is varied, the amount of fluid displaced by the pistons 204 of the motor 200 (and thus the fluid volume received or taken from the chambers of the pistons 205) varies.

Because of these interrelationships, the torque and/or output speed of the motor 201 can vary in an essentially proportional manner with respect to the angle of swash plate 202. The swash plate actuator 203, which in this example operates on differential hydraulic pressure, can be driven via solenoid valves (not shown), e.g., one for each of two pressure values, controlled electronically by the controller 105. In this way, the controller 105 can control the output speed (and/or torque) of the variator 104 via the application of electrical signals to solenoid valves associated with the swash plate actuator 203.

Referring again to FIG. 1, the controller 105 may include at least one electronic sensor input 110 to receive transmission data needed for determining when to shift, e.g., a transmission input speed signal, and a transmission output speed signal. Additionally, the controller 105 can be configured to be in communication with the operator interface 114 in order to receive information input by an operator regarding desired operating parameters of the transmission system 100. The controller 105 can further include at least one electronic range output 111 to control the range of the transmission, e.g., by controlling a clutch solenoid or otherwise. The controller 105 may be actuated via an included processor adapted to execute the steps and calculations described herein. The controller 105, through the processor may operate by executing computer-executable code, i.e., instructions, stored on a computer-readable medium such as ROM, RAM, flash, and other types of media, whether optical, magnetic, or electronic.

The transmission 103 may provide output power at output shaft 108 to drive a load. As will be appreciated by those of skill in the art, the rotational speed, e.g., RPM, of the output shaft 108 can be a function of a number of factors including the speeds and directions of the input shafts 106, 107, as well as a current range setting of the transmission 103. Thus, for a given selected range, the speed of the output shaft 108 may vary from a minimum speed for that range to a maximum speed for that range. The transmission range may be changed selectively in order to achieve higher or lower output speeds than those allowed by a present range.

In transmissions of this type, range changes may be synchronous, meaning that at the instant of a range change, no internal or external rotational elements change speed. However, after the range change, the relationship between the speeds and directions of the input shafts 106 and the speed of the output shaft 107 will be different for all values of these parameters except those at the shift point, sometimes referred to as the synchronous point. In addition, the torque of the variator 104 changes sign at the shift points.

Figure 3:
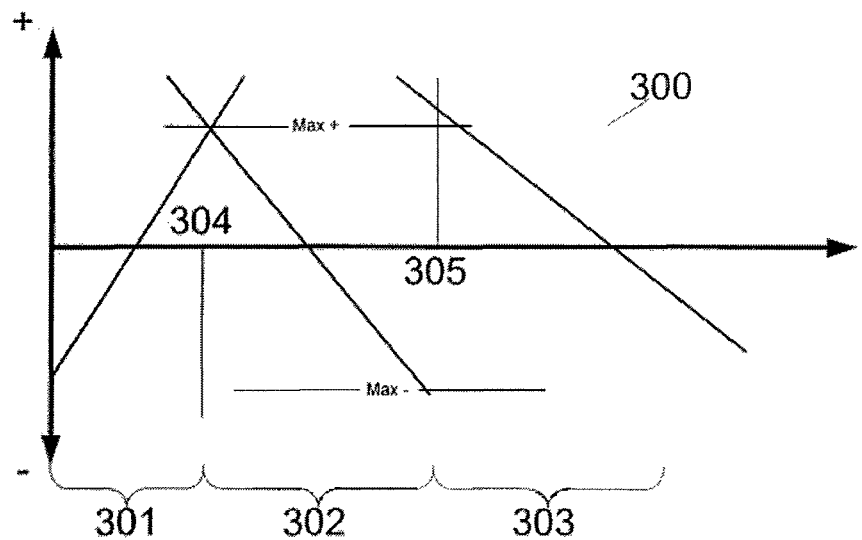
FIG. 3 is a simplified exemplary graph of a relationship between a motor speed ratio and a transmission ratio for a transmission such as shown schematically in FIG. 1.

This functionality will be better understood with reference to FIG. 3. FIG. 3 is a simplified exemplary plot 300 of the relationship between the speed ratio and the transmission ratio for a parallel path variable (PPV) transmission such as shown in FIG. 1. In FIG. 3, the horizontal or x-axis is the transmission ratio and the vertical or y-axis is the speed ratio. The transmission ratio is the transmission output speed divided by the transmission input speed (e.g., ratio of speeds of shafts 107 and 108). The motor speed ratio is the output speed of the variator divided by the input speed of the variator (e.g., the ratio of speeds of shafts 107 and 106), which in this case is represented by the speed of the pump 200 divided by the speed of the motor 201 (e.g., with reference to FIG. 2, the ratio of speeds of shafts 210 and 208).

Each transmission range enables a specific range 301, 302, 303 of output speeds. In the case of the illustrated embodiment, the range 301 can be considered low forward, the range 302 can be considered high forward gear, and range 303 can be considered auxiliary forward. While not shown in FIG. 3, the transmission may also include reverse gear ranges, such as low reverse and high reverse, that would be to the left of the y-axis in FIG. 3. At each shift point 304, 305, the output speed curves of adjacent ranges overlap along the horizontal dimension. It will be appreciated that in the illustrated example, the shift between ranges 301 and 302 is synchronous while the shift between ranges 302 and 303 is not synchronous. Thus, for example, at shift point 304, the engine speed, variator speed, and output speed are the same whether range 301 or 302 is selected. Thus, at point 304, a shift between ranges 301 and 302 can be smoothly made.

Figure 4:
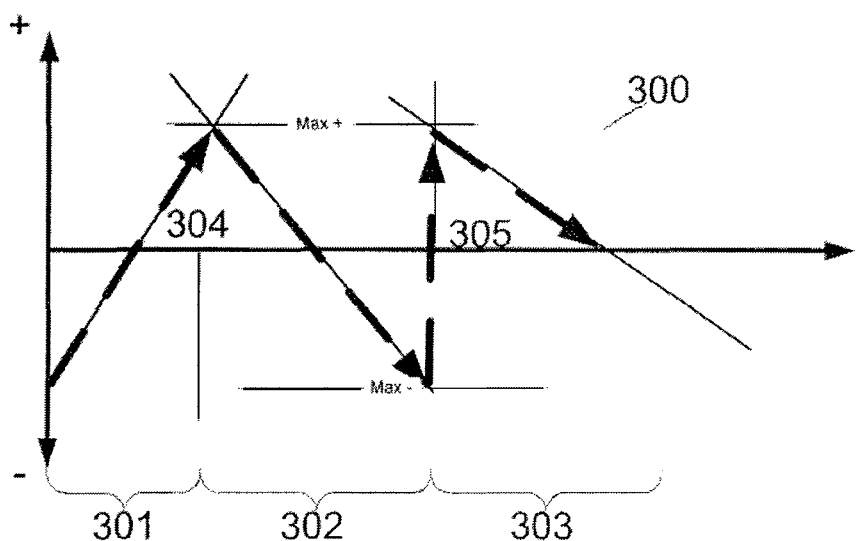
FIG. 4 is a simplified exemplary graph of a relationship between a motor speed ratio and a transmission ratio similar to FIG. 3 with an overlaid variator speed progression curve.

An exemplary idealized shifting behavior for a PPV transmission is illustrated in FIG. 4, which is a plot similar to that of FIG. 3, with an additional idealized variator speed progression curve (shown as a dashed line in FIG. 4) overlaid on the transmission characteristic curves. As can be seen from FIG. 4, starting at zero output speed, the actual variator speed is negative in this example. As the variator speed increases in the positive direction, the transmission output speed increases. As shift point 304 is reached, the transmission range shifts and the variator speed begins to decrease toward zero. At this time, the output speed continues to increase. In the middle of range 302, the variator speed crosses zero and begins to increase in the negative direction. During this time, the output speed also continues to increase. As shift point 305 is reached, the transmission range shifts and the variator speed goes to a value near its positive maximum and then decreases toward zero as the output speed continues to increase.

Figure 5:
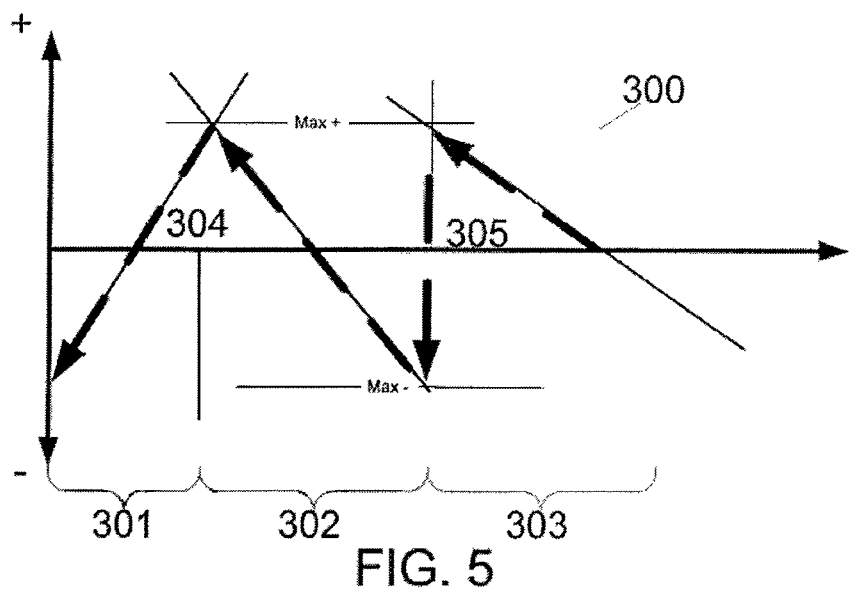
FIG. 5 is a simplified exemplary graph of a relationship between a motor speed ratio and a transmission ratio similar to FIG. 3 with an overlaid variator speed progression curve.

The idealized downshifting behavior shown in FIG. 5 is simply the reverse of the idealized up-shifting behavior, as shown by the direction of the arrow in the dashed line representing the ideal variator progression curve. In particular, as the variator speed varies smoothly between its positive and negative limits, range changes are made at shift points and the output speed decreases smoothly to zero.

Figure 6:
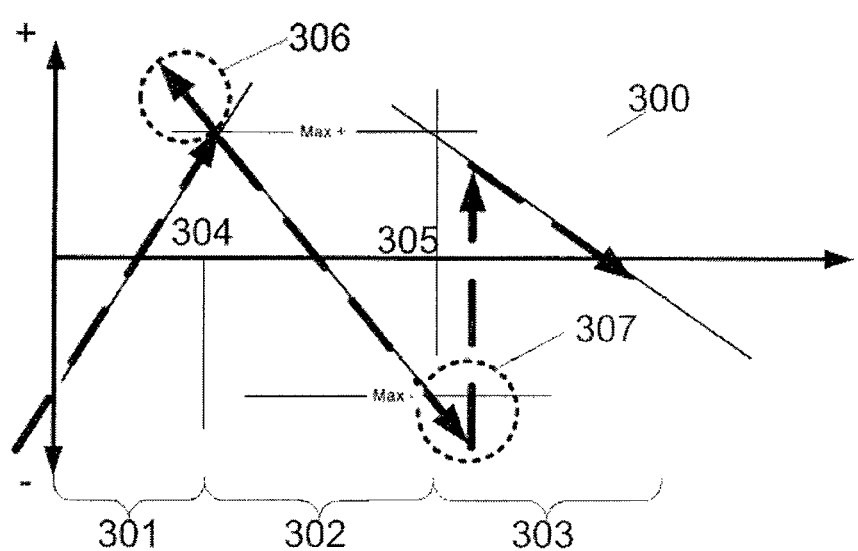
FIG. 6 is a simplified exemplary graph of a relationship between a motor speed ratio and a transmission ratio similar to FIG. 3 with an overlaid non-ideal variator speed progression curve.

FIG. 6 is the simplified characteristic output ratio plot 300 of FIG. 3, overlaid with exemplary non-ideal variator speed excursions near the first shift point 304 and second shift point 305 to illustrate the problem of drive train oscillation or "hunting." In this example, as the variator speed increases in the positive direction in range 301, the output speed rises. When the output speed reaches shift point 304, a shift is automatically executed, placing the system on the characteristic curve of range 302. However, subsequent to the shift, the output speed is reduced or "pulled down," such as by a sudden increase in load. This could happen, for example, when a grader strikes a large stone or a mound of earth, or when a drill bit encounters a layer of rock or other hard material.

As a result of the increased load and slowed output speed, the transmission is pushed back along the curve of range 302 toward a lower output speed as shown by path segment 306. This may drive the variator speed past its positive limit (max+) if a shift is prevented by the controller 105. Alternatively, an allowed shift may cause a drive train shock due to a step change in gear ratio under these conditions. The same type of situation can occur for sudden decreases in load just after a downshift.

Another type of irregular and potentially harmful behavior near shift points is shown in the region 307 of the plot 300 of FIG. 6. This occurs when an up-shift is executed after the shift point. Such a shift results in inefficiencies due to over-speed or under-speed of the engine and/or destroking (i.e., displacement change) within the variator 104.

Figure 7:
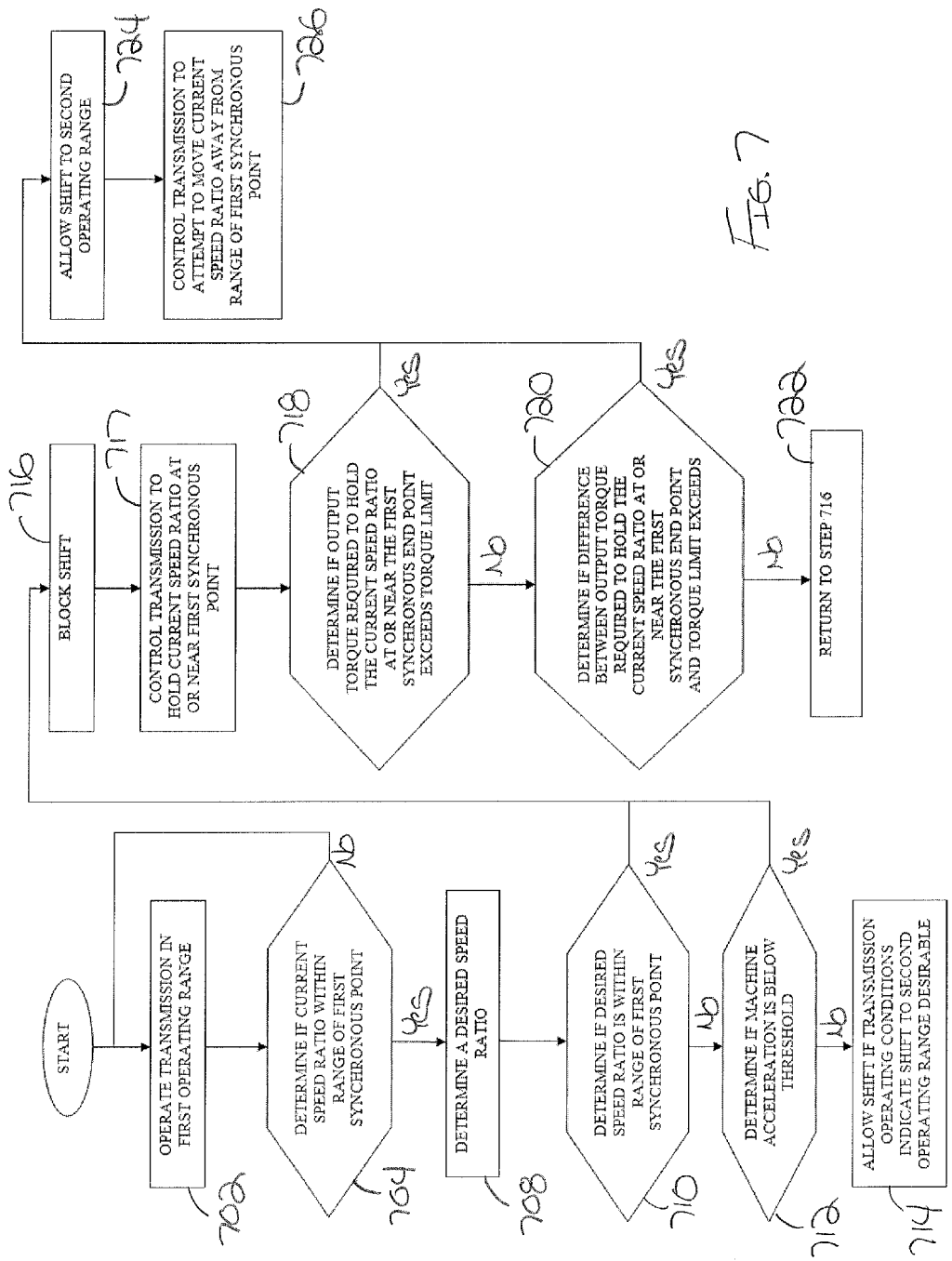
FIG. 7 is a flow chart illustrating a process for avoiding drive train oscillations in a transmission such as that of FIG. 11.

Consequently, within transmission systems such as split torque transmissions that have distinct shift points, it may be generally desirable to shift at an appropriate shift point, and to avoid excessive hunting or oscillation in the drive train when subsequent loading or unloading occurs. To that end, in one example, FIG. 7 provides a schematic flow diagram of a method and system for controlling a transmission system for a machine so as to at least partially avoid drive train oscillations. However, it will be appreciated that different implementations of what is disclosed herein may employ all or only a subset of the described method and system. The steps also may be performed in a different order than that shown in FIG. 7. Moreover, although the flow diagram of FIG. 7 assumes a transmission system such as shown in FIGS. 1 and 2, it will be understood by those skilled in the art that the described method and system are also applicable to other transmission systems.

With reference to FIG. 7, the transmission 103 is operating in a first operating range in step 702. For example, with reference to FIG. 3, the transmission 103 may be operating in the low forward range 301. In step 704, it is determined (e.g., by the controller 105) if the current speed ratio (the ratio of the speed of shafts 107 and 106) of the variator 104 is within a first predetermined range of a first synchronous shift point between the first operating range and a second operating range that is adjacent the first operating range. In the example where the transmission 103 is operating in the low forward range 301, the first synchronous shift point may be shift point 304 between the low forward and high forward ranges 301, 302. Thus, in this example, the disclosed system and method operates to determine whether to block an upshift of the transmission. If the current speed ratio is not within the first predetermined range, the transmission system is not operating in the area of the shift point and thus the method cycles back to the beginning as there is no reason to apply any anti-shift hunting strategy. As will be appreciated by those skilled in the art, the first operating range may be a range other than low forward. For example, the first operating range may be high forward 302 with the first synchronous shift point being shift point 304. In such a case, the disclosed system and method operates so as to determine whether to block a downshift of the transmission from the high forward range 302 to the low forward range 301.

A desired speed ratio for the transmission is determined in step 708. Again, this step 708 can be implemented by the controller 105 and may be determined based on information provided to the controller by the operator interface 114 for the machine. If the current speed ratio is within range of the shift point, the transmission may be susceptible to a shift hunting condition. Accordingly, in steps 710 and 712 it is determined whether a shift between the first operating range and the second operating range (e.g., low forward 301 and high forward 302) should be blocked. In step 708, which can also be implemented by the controller 105, it is determined if the desired speed ratio is within a second predetermined range of the speed ratio associated with the shift point. With reference to the example where the transmission is operating in the low forward range 301 and the current speed ratio is within range of the synchronous shift point 304 between the low forward and high forward ranges 301, 302, it is determined whether the desired speed ratio is also within the range of the shift point 304 in this step 710. If the desired speed ratio is within the second predetermined range, then a shift between the first and second operating ranges 301, 302 is blocked, for example by the controller 105, in step 716. In addition, note that the first predetermined range used in step 704 and the second predetermined range used in step 710 may be the same or they may be different.

If the desired speed ratio is not within the second predetermined range, it is next determined (e.g., by the controller 105) whether an acceleration of the machine is below a threshold acceleration in step 714. An acceleration below a threshold acceleration indicates that a load is keeping the transmission around the shift point and under such circumstances it is desirable to maintain the transmission in the current operating range. Accordingly, if the acceleration is found to be below the threshold in step 714, the controller 105 blocks the shift in step 716. Note that steps 710 and 712 can be performed in any order. If the desired speed ratio is not within the second predetermined range and the acceleration of the machine is not below threshold, then a shift between the first and second operating ranges 301, 302 may be permitted if the transmission operating conditions otherwise indicate that a shift would be desirable in step 714. As discussed above, the relevant shift (or blocked shift) can be either an upshift (e.g., from low forward 301 to high forward 302) or a downshift (e.g., from high forward 302 to low forward 301). In this respect, the first and second operating ranges can be any two operating ranges of the plurality of contiguous selectable operating ranges of the transmission that are adjacent and separated by synchronous point.

Once a shift between the first and second operating ranges 301, 302 is blocked in step 716, then the transmission system 100, and in particular the variator 104, is controlled so as to hold the current speed ratio at or near the first synchronous shift point in step 717. This step 717 can be implemented by the controller 105 using a speed control strategy. In the example where the transmission is operating in the low forward range 301, the controller 105 would direct the variator 104 so as to hold the speed ratio at or near the shift point 304. Holding the current speed ratio at or near the shift point will help ensure that when a shift is allowed by the system, the shift is clean and smooth.

Next, the system and method of FIG. 7 determines when it may be appropriate to stop blocking the shift and allow the transmission to shift between the first and second operating ranges. Some possible shift conditions are shown in steps 718 and 720 of FIG. 7. More specifically, in step 718, it is determined if the output torque that is required from the transmission to hold the current speed ratio at or near the first synchronous shift point 304 (see step 706) exceeds a predetermined torque limit for the transmission. Additionally, in step 720, it is determined if the different between the output torque that is required from the transmission to hold the current speed ration near the first synchronous shift point 304 (see step 706) and the predetermine torque limit for the transmission exceeds a threshold amount. If either of the conditions evaluated in steps 718 and 720 are determined to be present, a shift to the second operating range is permitted in step 724. If neither is present, the system proceeds to step 722 and the shift remains blocked and the system continues to control the transmission so that the current speed ratio is at or near the first synchronous point (see step 717). Steps 718 and 720 can both be implemented by the controller and can be performed in any particular order. Instead of returning to step 716, the disclosed system and method could also return to the start position, for example, if the speed control (see step 717) is unable to maintain the motor speed ratio window (e.g., the load is too large) or if the operator has changed his input commands to the operator interface enough that the transmission can exit from the shift point.

Once a shift to the second operating range 302 is permitted (in step 724), the system can be configured to attempt to drive the transmission system away from the shift point 304 so as to help avoid further shift-hunting issues. More specifically, as shown in step 726, the transmission system may be controlled to attempt to move the current speed ratio away from the first synchronous shift point 304 so that it would no longer be within the first predetermined range. If successful, the shift hunting control system can be exited and the transmission can be controlled via another control scheme, such as torque. If for some reason, for example torque limits, the transmission cannot drive away from the shift point, then the shift-hunting control system can remain active and continue to control the current speed ratio to hold it at or near the first synchronous point 304 so that if it becomes necessary to shift back to the first operating range 301, such a shift can be executed smoothly.

INDUSTRIAL APPLICABILITY

The methods and systems described herein may be implemented in a variety of different machines that utilize transmission having synchronous points for shifting, e.g., PPV transmissions or split torque transmissions. Such machines can be used in heavy industrial applications such as mining, construction, agriculture, transportation or the like and can include a wheel loader, track loader, bulldozer, excavator, dump truck, backhoe, grader, material handler or the like. The disclosed methods and systems can provide an improved operating experience to the machine operator as well as increased drive train longevity by controlling the transmission to at least partially avoid drive train oscillation. Moreover, as compared to shift hunting control systems that lock out certain transmission ranges in reaction to operator commands and machine load, the disclosed systems and methods, which employ speed control, provide a more proactive approach to shift hunt control that yields smoother shifts between transmission ranges.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of controlling a transmission for a machine to at least partially avoid drive train oscillation, the transmission having a variator and a plurality of contiguous selectable operating ranges, one or more pairs of adjacent operating ranges being separated by respective synchronous points, the method comprising:
   operating the transmission in a first operating range;
   detecting whether a current speed ratio defined as an output speed of the variator divided by an input speed of the variator is within a first predetermined range of a speed ratio associated with a first synchronous point lying between the first operating range and the second operating range;
   determining a desired speed ratio;
   determining if the desired speed ratio is within a second predetermined range of the speed ratio associated with the first synchronous point;
   determining if a rate of acceleration of the machine is below a threshold acceleration; and
   preventing a shift between the first and second operating ranges and controlling the variator to hold the current speed ratio at or near the first synchronous point if the desired speed ratio is within the second predetermined range or the rate of acceleration of the machine is below the threshold acceleration.

2. The method according to claim 1 further including the step of causing the transmission to shift from the first operating range to the second operating range if a shift condition exists.

3. The method according to claim 2 wherein the shift condition comprises a difference between a transmission output torque required to maintain the current speed ratio at or near the first synchronous point and an allowed output torque limit reaching a predetermined threshold.

4. The method according to claim 2 wherein the shift condition comprises a transmission output torque required to hold the current speed ratio at or near the first synchronous point exceeding an allowed output torque limit.

5. The method according to claim 2 further including the step of controlling the transmission such that the current speed ratio moves away from the first predetermined range after the transmission shifts from the first operating range to the second operating range.

6. The method according to claim 5 further including the step of preventing a further shift between the first and second operating ranges if the current speed ratio cannot be moved away from the first predetermined range.

7. The method according to claim 1 wherein the desired speed ratio is based on information received from an operator at an operator interface.

8. A system for reducing drive train oscillations in a machine comprising:
   a transmission including a variator, the transmission having a plurality of contiguous selectable operating ranges, one or more pairs of adjacent operating ranges being separated by respective synchronous points;
   an operator interface for inputting information regarding operation of the transmission;
   a controller in communication with the transmission and the operator interface, the controller being configured to:
      detect whether a current speed ratio defined as an output speed of the variator divided by an input speed of the variator is within a first predetermined range of a speed ratio associated with a synchronous point;
      determine whether a desired speed ratio based on information from the operator interface is within a second predetermined range of the speed ratio associated with the synchronous point;
      determine if a rate of acceleration of the machine is below a threshold acceleration;
      prevent a shift between a first and a second operating ranges and control the variator to hold the current speed ratio at or near the synchronous point if the desired speed ratio is within the second predetermined range or the rate of acceleration of the machine is below the threshold acceleration.

9. The system according to claim 8 wherein the controller is configured to cause the transmission to shift between the first operating and second operating ranges if a shift condition exists.

10. The system according to claim 9 wherein the shift condition comprises a difference between a transmission output torque required to maintain the current speed ratio at or near the first synchronous point and an allowed output torque limit reaching a predetermined threshold.

11. The system according to claim 9 wherein the shift condition comprises a transmission output torque required to hold the current speed ratio at or near the first synchronous point exceeding an allowed output torque limit.

12. The system according to claim 9 wherein the controller is configured to control the transmission such that the current speed ratio moves away from the first predetermined range after the transmission shifts between the first and second operating ranges.

13. The system according to claim 12 wherein the controller is configured to prevent a further shift between the first and second operating ranges if the current speed ratio cannot be moved away from the first predetermined range.

14. A system for reducing drive train oscillations in a machine comprising:
   an engine;
   a transmission operably connected to the engine, the transmission including a variator, the transmission having a plurality of contiguous selectable operating ranges, one or more pairs of adjacent operating ranges being separated by respective synchronous points;
   an operator interface for inputting information regarding operation of the transmission;
   a controller in communication with the transmission and the operator interface, the controller including at least one sensor input to receive transmission data and at least one transmission output speed signal, the controller being configured to:
      detect whether a current speed ratio defined as an output speed of the variator divided by an input speed of the variator is within a first predetermined range of a speed ratio associated with a synchronous point;
      determine whether a desired speed ratio based on information from the operator interface is within a second predetermined range of the speed ratio associated with the synchronous point;

determine if a rate of acceleration of the machine is below a threshold acceleration; and prevent a shift between a first and a second operating ranges and control the variator to hold the current speed ratio at or near the synchronous point if the desired speed ratio is within the second predetermined range or the rate of acceleration of the machine is below the threshold acceleration.

15. The system according to claim 14 wherein the controller is configured to cause the transmission to shift between the first operating and second operating ranges if a shift condition exists.

16. The system according to claim 15 wherein the shift condition comprises a difference between a transmission output torque required to maintain the current speed ratio at or near the first synchronous point and an allowed output torque limit reaching a predetermined threshold.

17. The system according to claim 15 wherein the shift condition comprises a transmission output torque required to hold the current speed ratio at or near the first synchronous point exceeding an allowed output torque limit.

18. The system according to claim 15 wherein the controller is configured to control the transmission such that the current speed ratio moves away from the first predetermined range after the transmission shifts between the first and second operating ranges.

19. The system according to claim 18 wherein the controller is configured to prevent a further shift between the first and second operating ranges if the current speed ratio cannot be moved away from the first predetermined range.

* * * * *